United States Patent
Hepworth et al.

(10) Patent No.: US 7,353,999 B2
(45) Date of Patent: Apr. 8, 2008

(54) GRAPHICAL CODE READER CONFIGURED FOR DATA COLLECTION AND DECODING

(75) Inventors: Paul Hepworth, Riverton, UT (US); Jeremy Williams, Riverton, UT (US)

(73) Assignee: The Code Corporation, Draper, UT (US)

(*) Notice: Subject to any disclaimer, the term of this patent is extended or adjusted under 35 U.S.C. 154(b) by 395 days.

(21) Appl. No.: 11/036,773

(22) Filed: Jan. 14, 2005

(65) Prior Publication Data

US 2005/0178842 A1 Aug. 18, 2005

Related U.S. Application Data

(60) Provisional application No. 60/537,224, filed on Jan. 16, 2004.

(51) Int. Cl.
*G02B 26/10* (2006.01)
(52) U.S. Cl. .................. 235/462.25; 235/462.01; 235/462.09
(58) Field of Classification Search ........... 235/462.09, 235/462.25, 462.11, 462.01
See application file for complete search history.

(56) References Cited

U.S. PATENT DOCUMENTS

| | | | |
|---|---|---|---|
| 4,488,679 A | 12/1984 | Bockholt et al. | |
| 5,223,701 A | 6/1993 | Batterman et al. | |
| 5,465,291 A | 11/1995 | Barrus et al. | |
| 5,677,522 A * | 10/1997 | Rice et al. | 235/454 |
| 5,978,773 A | 11/1999 | Hudetz et al. | |
| 6,032,195 A | 2/2000 | Reber et al. | |
| 6,247,646 B1 | 6/2001 | Iwaguchi et al. | |
| 6,318,635 B1 * | 11/2001 | Stoner | 235/462.45 |
| 6,347,163 B2 * | 2/2002 | Roustaei | 382/324 |
| 6,384,744 B1 | 5/2002 | Philyaw et al. | |
| 6,561,428 B2 * | 5/2003 | Meier et al. | 235/462.25 |
| 6,572,017 B1 * | 6/2003 | Stoner | 235/462.12 |
| 6,814,290 B2 * | 11/2004 | Longacre | 235/462.1 |

FOREIGN PATENT DOCUMENTS

EP 0 837 406 4/1998

* cited by examiner

*Primary Examiner*—Ahshik Kim
(74) *Attorney, Agent, or Firm*—Madson & Austin

(57) ABSTRACT

A graphical code reader includes an imager that provides image data corresponding to a two-dimensional image of a graphical code. The graphical code reader also includes a processor and memory in electronic communication with the processor. The graphical code reader also includes an imager interface. The imager interface facilitates transfer of the image data from the imager to the memory. The processor does not receive the image data as the image data is being transferred from the imager to the memory. The imager interface comprises a control bus interface, an address bus interface, and a data bus interface.

13 Claims, 12 Drawing Sheets

GRAPHICAL CODE READER CONFIGURED FOR DATA COLLECTION AND DECODING

RELATED APPLICATIONS

This application is related to and claims priority from U.S. Patent Application Ser. No. 60/537,224, filed Jan. 16, 2004, for "Graphical Code Reader Configured For Data Collection And Decoding," with inventor Paul Hepworth, which is incorporated herein by reference.

TECHNICAL FIELD

The present invention relates generally to graphical code readers. More specifically, the present invention relates to a graphical code reader that is configured to perform the functions of data collection and decoding.

BACKGROUND

Computer technology has entered many areas to simplify manual tasks and to make information more readily available. Computer programs can be used for many purposes including assisting a person in performing his or her job. For example, word processors help computer users prepare documents, spreadsheet programs help users perform accounting functions and numerical analysis, diagnostic programs assist users in diagnosing problems, etc. There are many programs available to help users with almost any need they may have.

One way to input data into a computer program involves the use of machine-readable graphical codes ("graphical codes"). A graphical code is a graphical representation of data that consists of multiple graphical code elements having different light reflective or light emissive properties. Examples of different types of graphical codes include bar codes, data matrix codes, MaxiCodes, and so forth. Graphical codes have become widely used in many commercial environments, such as point-of-sale stations in retail stores and supermarkets, inventory and document tracking, and the like.

Two-dimensional graphical codes possess several advantages over one-dimensional graphical codes. For example, two-dimensional graphical codes are designed to store considerably more information than one-dimensional graphical codes. In addition, two-dimensional graphical codes are typically smaller than one-dimensional codes. Also, in some cases, two-dimensional graphical codes do not require a high level of print quality in order to be decoded.

Where information from a two-dimensional graphical code is to be provided to a computer program running on a computer system, a graphical code reader is typically placed in electronic communication with the computer system. The graphical code reader includes an imager that generates image data corresponding to an image of the graphical code. The graphical code reader typically also includes a processor for controlling the imager and for decoding the image data. Once the image data has been decoded, the decoded image data is then provided to the computer program, which uses the decoded image data. The processor in the computer system, not the processor in the graphical code reader, executes the software application that uses the decoded image data (i.e., the data in the graphical code).

In some circumstances, it may not be desirable for the software application that uses the graphical code data to reside on a separate computer system. Accordingly, benefits may be realized by a graphical code reader that is configured to perform the functions that are typically performed by the separate computer system.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
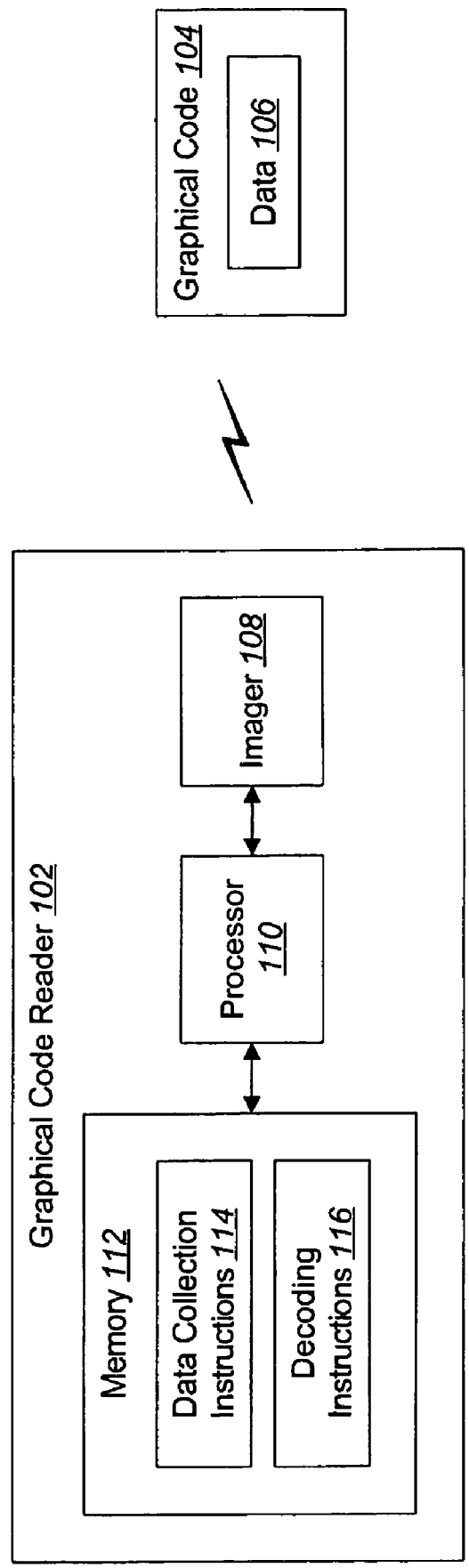
FIG. 1 is a block diagram illustrating an embodiment of a graphical code reader.

A graphical code reader is disclosed. The graphical code reader includes an imager. The imager provides image data corresponding to a two-dimensional image of a graphical code. The graphical code comprises graphical code data. The graphical code reader also includes a processor, memory in electronic communication with the processor, and data processing instructions in the memory.

The graphical code reader also includes an imager interface. The imager interface facilitates transfer of the image data from the imager to the memory. The imager interface comprises a control bus interface, an address bus interface, and a data bus interface. The control bus interface is in electronic communication with a first portion of a control bus and with a second portion of the control bus. The first portion of the control bus couples the processor to the control bus interface. The second portion of the control bus couples the control bus interface to the memory. The address bus interface is in electronic communication with an address bus that couples the processor to the memory. The data bus interface is in electronic communication with a data bus that couples the processor to the memory.

Address generation instructions are stored in the memory. The address generation instructions are executable by the processor to implement a method by which the image data is transferred from the imager to the memory.

The method implemented by execution of the address generation instructions involves setting the imager interface to an active mode. The method also involves generating an address in the memory for storing the image data. The method also involves providing a read signal on the first portion of the control bus. In response to the read signal on the first portion of the control bus, the control bus interface provides a write signal on the second portion of the control bus. The method also involves providing an address signal on the address bus. The address signal comprises the address, and the address bus interface detects timing of the address signal. The data bus interface provides the image data on the data bus in coordination with the timing of the address signal.

The imager interface may be implemented using a programmable logic device. For example, the imager interface may be implemented using a field-programmable gate array.

In some embodiments, the field-programmable gate array is configured from dedicated programmable read-only memory when the graphical code reader is powered on. In such embodiments, the graphical code reader may be configured so that the processor does not access random access memory until the field-programmable gate array is configured.

Alternatively, the field-programmable gate array is configured from the processor when the graphical code reader is powered on. In such embodiments, the graphical code reader may be configured so that the processor uses read-only memory and registers to configure the field-programmable gate array, and the processor does not access random access memory until the field-programmable gate array is configured. Alternatively still, a dedicated memory interface may be used for image capture.

In some embodiments, the graphical code reader may include a passive bypass circuit. The passive bypass circuit allows the processor to access random access memory even when the field-programmable gate array has not been configured.

Various embodiments of the invention are now described with reference to the Figures, where like reference numbers indicate identical or functionally similar elements. It will be readily understood that the components of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

FIG. 1 is a block diagram illustrating an embodiment of a graphical code reader 102. The graphical code reader 102 is a device for identifying or extracting data 106 from a graphical code 104. Examples of different types of graphical codes 104 include bar codes, data matrix codes, MaxiCodes, and so forth. The graphical code reader 102 is typically a handheld device.

The graphical code reader 102 includes an imager 108. The imager 108 generates image data corresponding to a two-dimensional image of the graphical code 104. The image data is typically decoded in order to obtain the data 106 in the graphical code 104. Additional details about exemplary embodiments of the imager 108 are provided below.

The graphical code reader 102 also includes a processor 110 and memory 112. The processor 110 controls the operation of the graphical code reader 102 and may be embodied as a microprocessor, a microcontroller, a digital signal processor (DSP) or other device known in the art. The processor 110 typically performs logical and arithmetic operations based on program instructions stored within the memory 112.

As used herein, the term "memory" 112 is broadly defined as any electronic component capable of storing electronic information, and may be embodied as read only memory (ROM), random access memory (RAM), magnetic disk storage media, optical storage media, flash memory devices in RAM, on-board memory included with the processor 110, EPROM memory, EEPROM memory, registers, etc., including combinations thereof. The memory 112 typically stores program instructions and other types of data. The program instructions may be executed by the processor 110 to implement some or all of the methods disclosed herein.

The program instructions stored in the memory 112 include data collection instructions 114 and decoding instructions 116. The processor 110 executes the data collection instructions 114 to obtain and use the data 106 in the graphical code 104. Typically, this involves obtaining image data from the imager 108 and then decoding the image data. Accordingly, in some embodiments, the data collection instructions 114 may include at least one call to the decoding instructions 116. The processor 110 executes the decoding instructions 116 to decode the image data from the imager 108. The same processor 110 executes both the data collection instructions 114 and the decoding instructions 116.

The data collection instructions 114 may be embodied as a computer program that obtains and uses the graphical code data 106. Such a computer program may use the graphical code data 106 to carry out a wide variety of different tasks, such as fixed asset inventory control, point-of-sale transactions, stock taking, records management, time-and-attendance monitoring, work-in-process inventory tracking, and so forth.

Typically, image data from the imager 108 is transferred from the imager 108 to the memory 112 for decoding. In some embodiments, the processor 110 may control the transfer of the image data from the imager 108 to the memory 112. Alternatively, the graphical code reader 102 may include an imager interface that facilitates transfer of the image data from the imager 108 to the memory 112. The imager interface may be configured so that the processor 110 does not first receive the image data from the imager 108 and then subsequently write it to the memory 112. In other words, the imager interface 118 may be thought of as implementing a type of pseudo direct memory access (DMA), the data from the imager 108 going directly to the memory 112.

Figure 2:
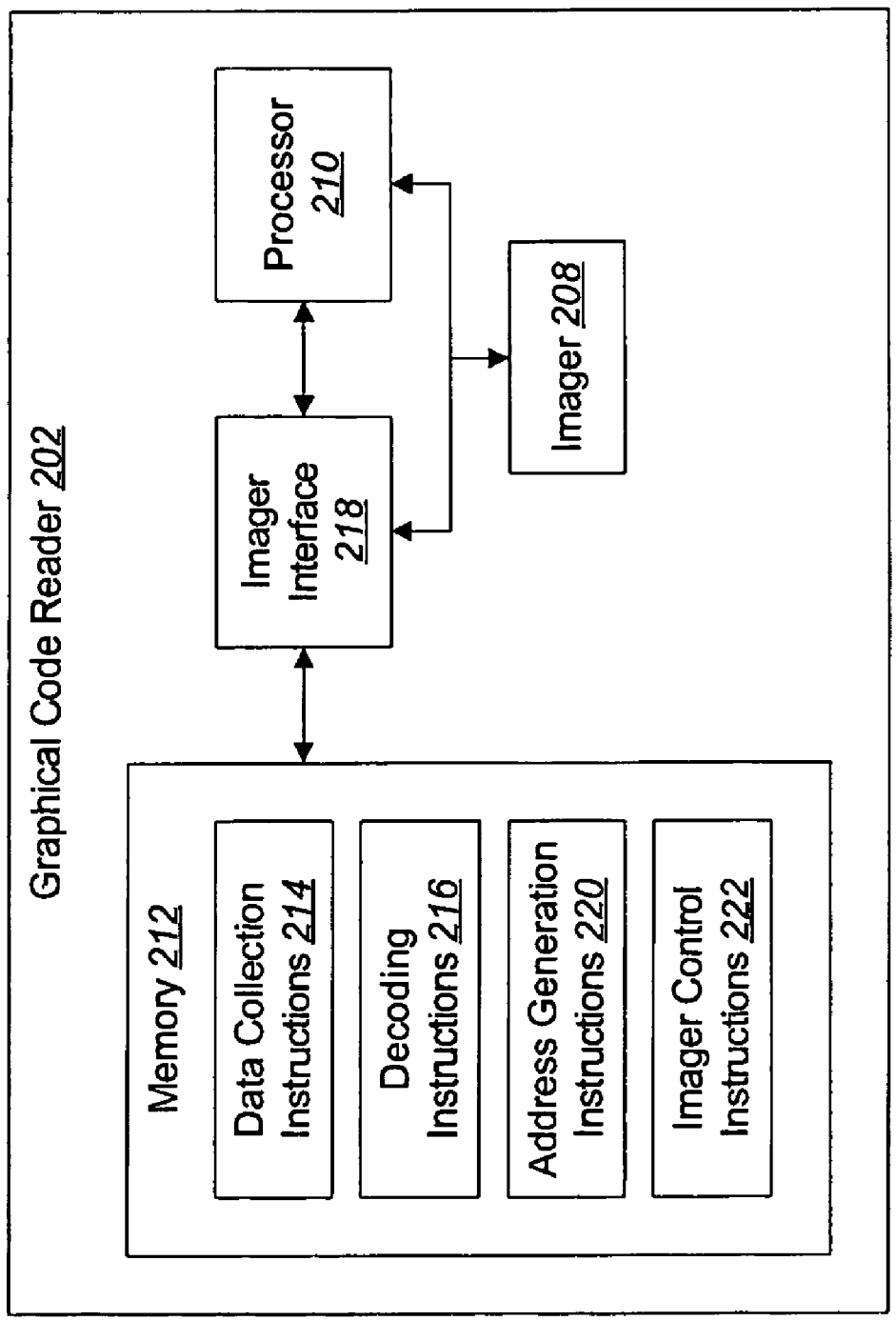
FIG. 2 is a block diagram illustrating an alternative embodiment of a graphical code reader.

FIG. 2 is block diagram illustrating an alternative embodiment of a graphical code reader 202. The graphical code reader 202 shown in FIG. 2 includes an imager interface 218. The imager interface 218 may be implemented in a programmable logic device (PLD), such as a field programmable gate array (FPGA), a complex PLD (CPLD), or the like.

The embodiment of the graphical code reader 202 shown in FIG. 2 also includes address generation instructions 220 stored in the memory 212. The processor 210 executes the address generation instructions 220 in order to generate one or more memory 212 addresses where image data from the imager 208 will be stored. Typically, the address generation instructions 220 are executed when image data is being transferred from the imager 208 to the memory 212. Additional details about exemplary embodiments of the address generation instructions 220 are provided below.

Imager control instructions 222 are also stored in the memory 212. The processor 210 executes the imager control instructions 222 to control at least some aspects of the operation of the imager 208. Typically, the same processor 210 that executes the data collection instructions 214 and the decoding instructions 216 also executes the imager control instructions 222. Additional details about exemplary embodiments of the imager control instructions 222 are provided below.

Figure 3:
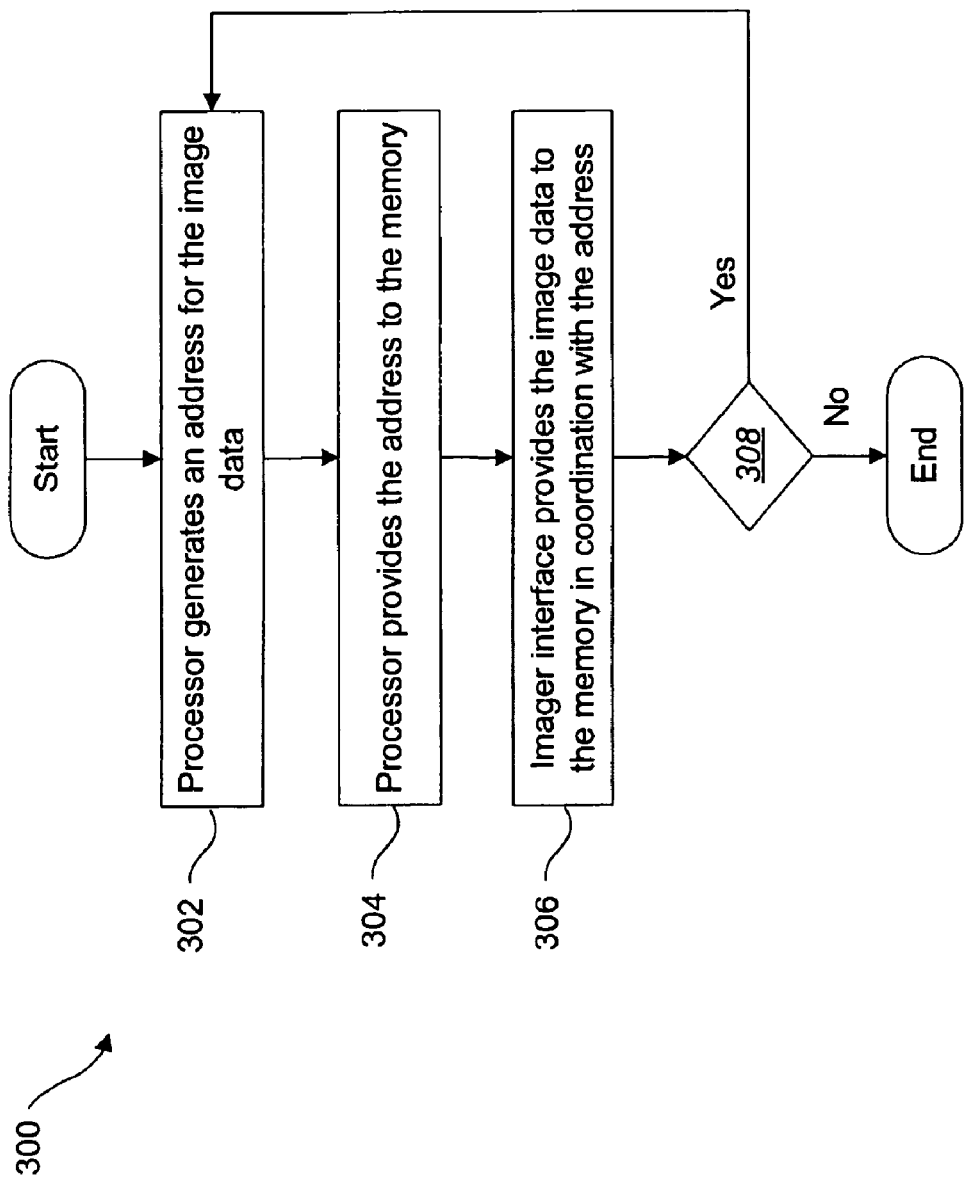
FIG. 3 is flow diagram illustrating an exemplary method for transferring image data from the imager to the memory for decoding.

FIG. 3 is flow diagram illustrating an exemplary method 300 for transferring image data from the imager 208 to the memory 212 for decoding. The method 300 may be implemented by some or all of the components shown in FIG. 2. The method 300 begins when the processor 210 generates 302 an address for the image data and provides 304 the address to the memory 212. The address generation instructions 220 may include standard calls to the processor for performing these steps 302, 304.

The imager interface 218 provides 306 the image data to the memory 212 in coordination with the address. It is then determined 308 whether there is any additional image data to be transferred to the memory 212. If there is additional image data, the method 300 returns to step 302 and proceeds as described above. If there is no additional image data, the method 300 ends.

Figure 4:
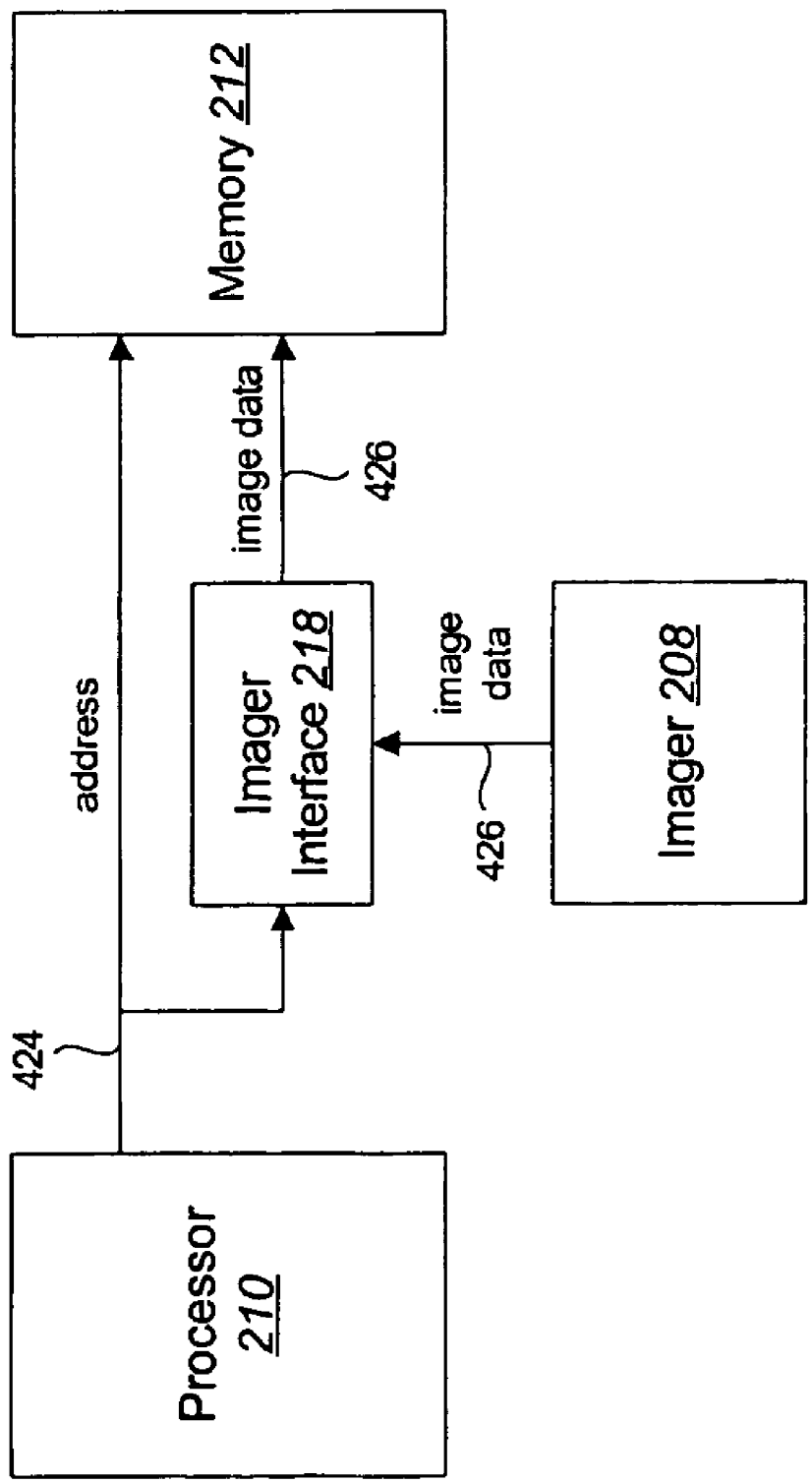
FIG. 4 is a signal flow diagram for the graphical code reader of FIG. 2 during the method of FIG. 3.

FIG. 4 is a signal flow diagram for the graphical code reader 202 of FIG. 2 during the method 300 of FIG. 3. The processor 210 generates an address 424 for the image data 426 that is to be transferred to the memory 212. The processor 210 provides the address 424 to the memory 212 and to the imager interface 218. The imager interface 218 obtains the image data 426 from the imager 208. The imager interface 218 detects the timing of the address 424 and provides the image data 426 to the memory 212 in coordination therewith.

Figure 5:
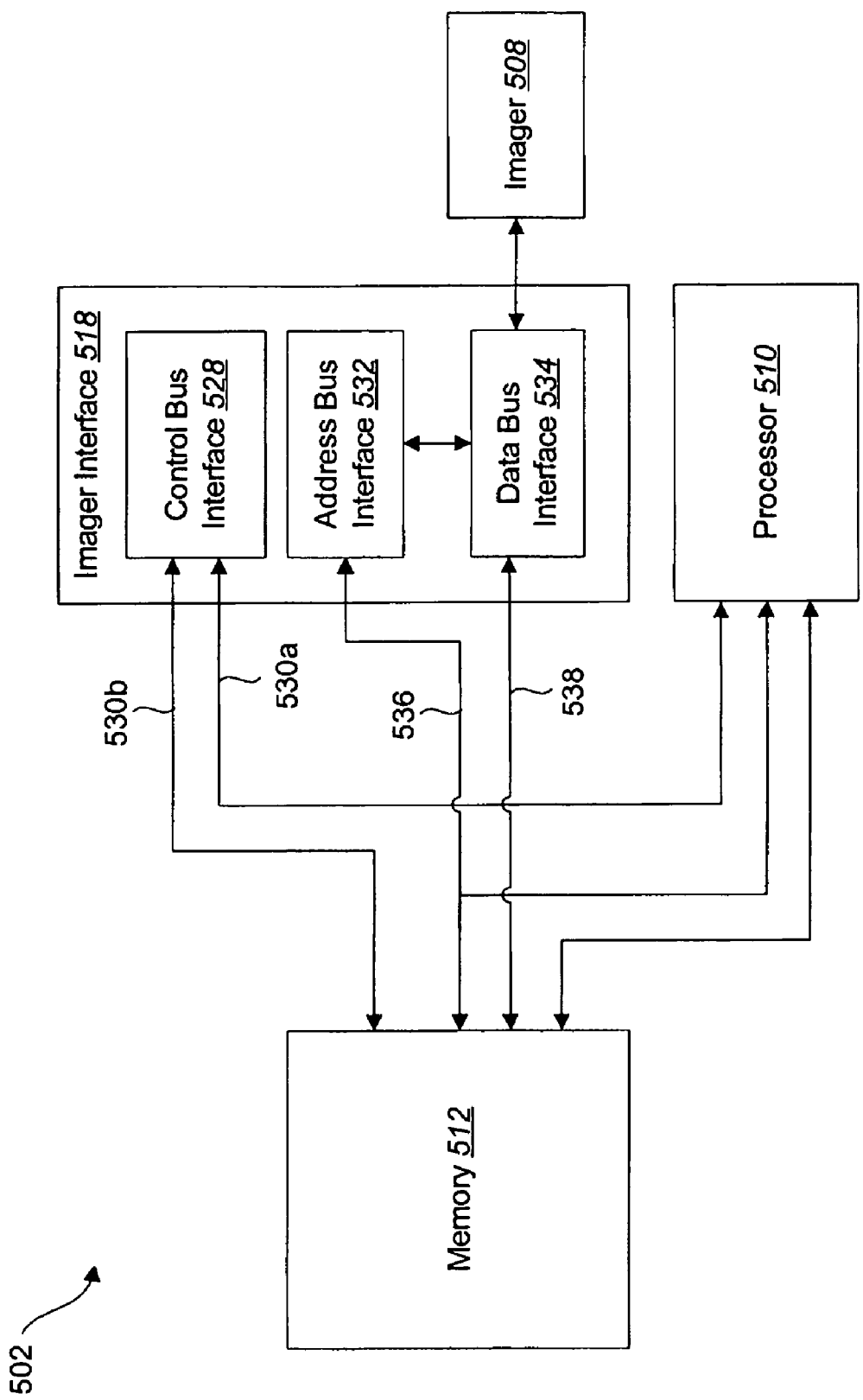
FIG. 5 is a block diagram illustrating another embodiment of a graphical code reader.

FIG. 5 is a block diagram illustrating another embodiment of a graphical code reader 502. As before, the graphical code reader 502 includes an imager 508, a processor 510, memory 512, and an imager interface 518.

The embodiment of the imager interface 518 shown in FIG. 5 includes a control bus interface 528. The control bus interface 528 is in electronic communication with a first portion of a control bus 530a and with a second portion of a control bus 530b. The first portion of the control bus 530a couples the processor 510 to the control bus interface 528. The second portion of the control bus 530b couples the control bus interface 528 to the memory 512.

The control bus interface 528 has two states, an active state and a passive state. In some embodiments, the control bus interface 528 acts as an inverter in the active state, so that a signal on the first portion of the control bus 530a is inverted on the second portion of the control bus 530b. For example, a "read" signal from the processor 510 would become a "write" signal when it is delivered to the memory 512. When in the passive state, the control bus interface 528 passes signals between the first portion of the control bus 530a and the second portion of the control bus 530b without modification.

The imager interface 518 also includes an address bus interface 532 and a data bus interface 534. The address bus interface 532 is in electronic communication with an address bus 536. The data bus interface 534 is in electronic communication with a data bus 538. Both the address bus 536 and the data bus 538 couple the processor 510 to the memory 512. The address bus interface 532 and the data bus interface 534 are in electronic communication with each other. The data bus interface 534 is in electronic communication with the imager 508. In some embodiments, the imager interface 518 includes a buffer (not shown) for temporarily storing image data from the imager 508. In some embodiments, the data bus interface 534 includes a buffer (not shown) for temporarily storing image data from the imager 508.

Figure 6:
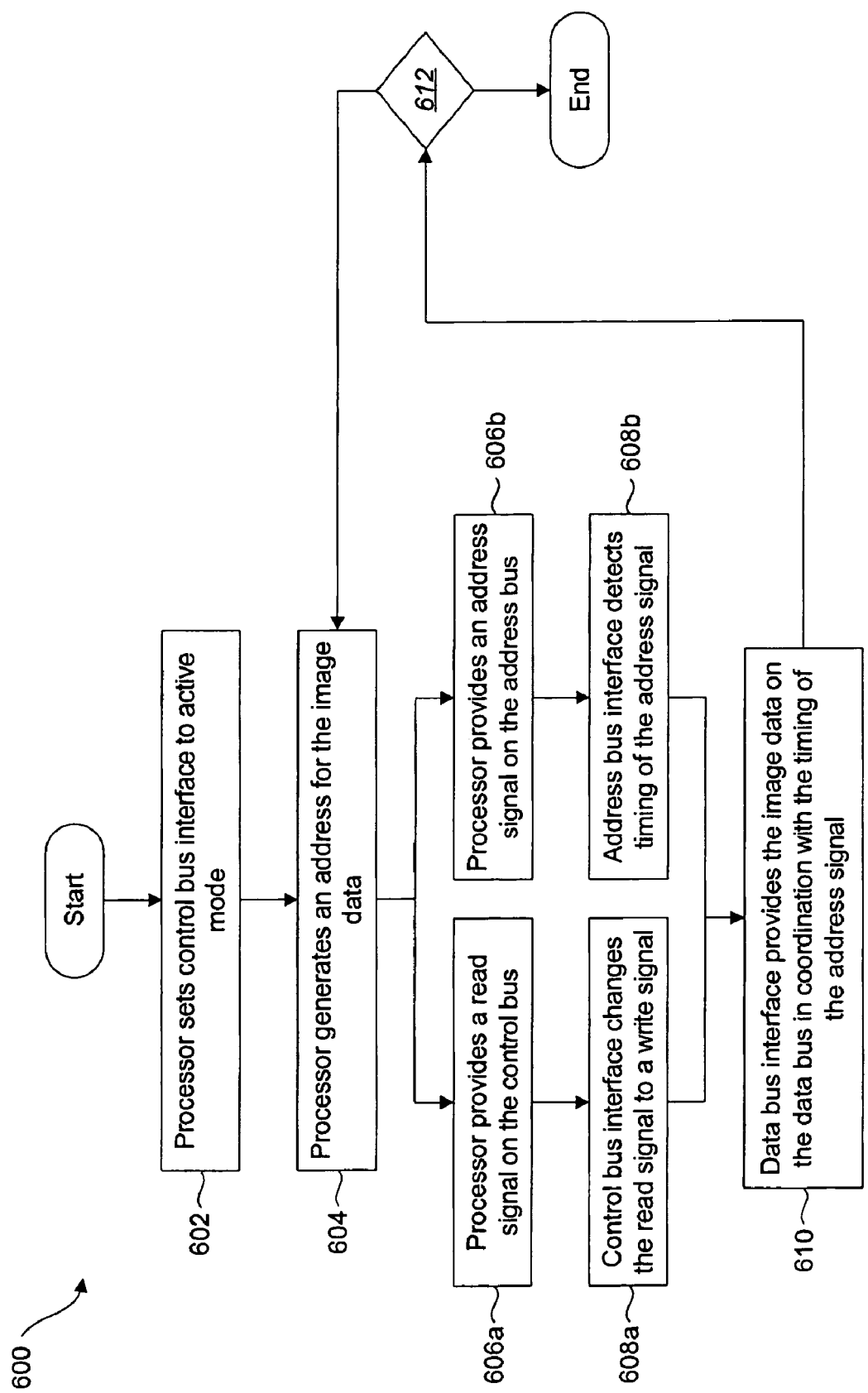
FIG. 6 is a flow diagram illustrating another exemplary method for transferring image data from the imager to the memory for decoding.

FIG. 6 is a flow diagram illustrating another exemplary method 600 for transferring image data from the imager 508 to the memory 512 for decoding. The method 600 may be implemented by some or all of the components shown in FIG. 5.

The method 600 begins when the processor 510 sets 602 the control bus interface 528 to the active state. The processor generates 604 an address for the image data that is to be transferred to the memory 512. The processor 510 provides 606a a read signal on the first portion of the control bus 530a. In parallel to this step, the processor 510 provides 606b an address signal on the address bus 536. The address signal includes the address generated in step 604. As stated previously, the graphical code reader 502 may include address generation instructions 220 stored in the memory 512. Steps 602 through 606a, 606b are typically performed by the processor 510 during execution of the address generation instructions 220.

The control bus interface 528 changes 608a the read signal on the first portion of the control bus 530a so that a write signal is provided on the second portion of the control bus 530b. In parallel to this step, the address bus interface 532 detects 608b the timing of the address signal on the address bus 536. The data bus interface 534 provides 610 the image data on the data bus 538 in coordination with the timing of the address signal, as detected by the address bus interface 532 in step 608b.

It is then determined 612 whether there is any additional image data to be transferred to the memory 512. If there is additional image data, the method 600 returns to step 604 and proceeds as described above. If there is no additional image data, the method 600 ends. In embodiments where the imager interface 518 or the data bus interface 534 includes a buffer for temporary storage of the image data, step 612 may involve determining whether there is any image data in the buffer.

Figure 7:
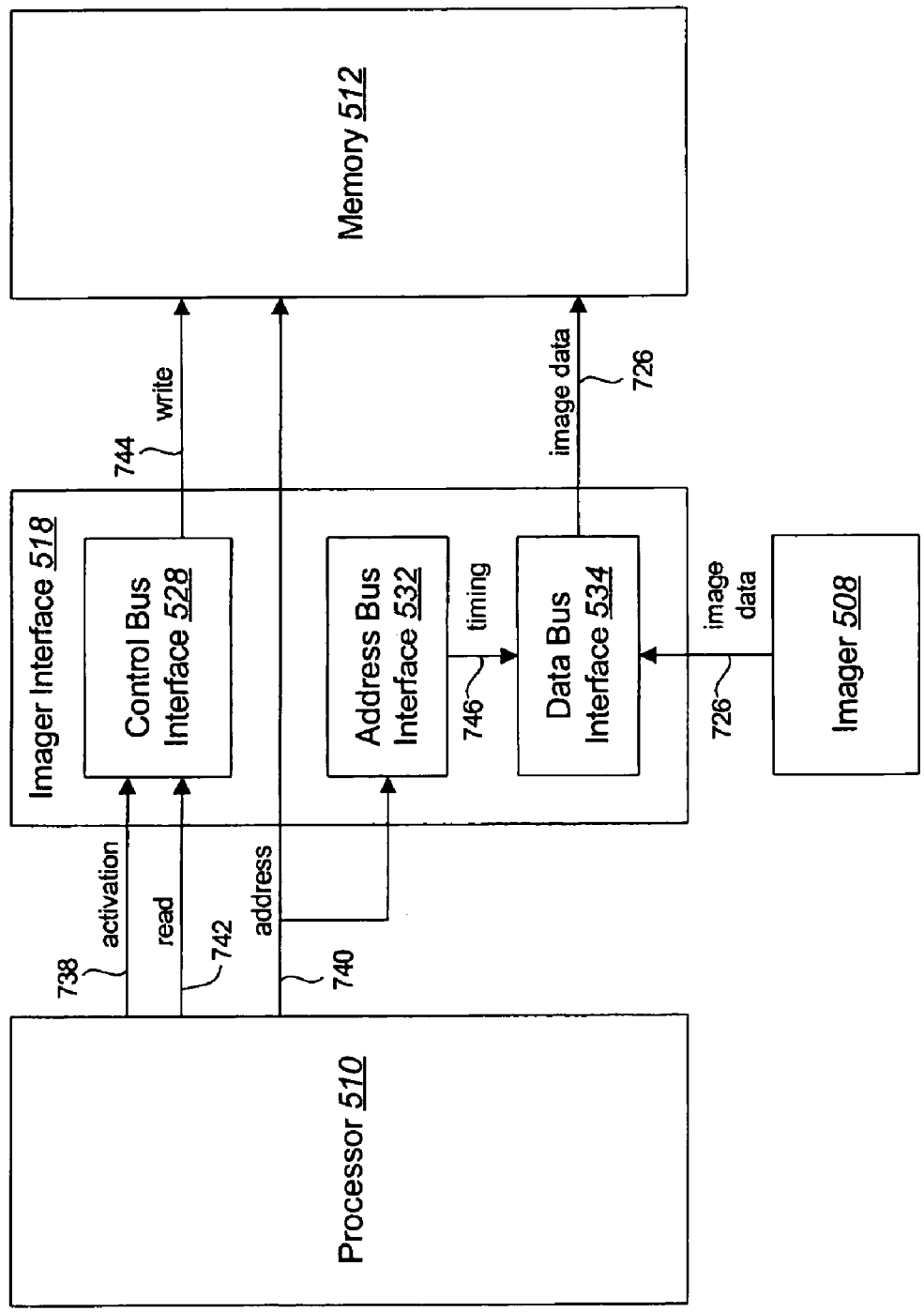
FIG. 7 is a signal flow diagram for the graphical code reader of FIG. 5 during the method of FIG. 6.

FIG. 7 is a signal flow diagram for the graphical code reader 502 of FIG. 5 during the method 600 of FIG. 6. The processor 510 sends an activation signal 738 to the control bus interface 528 to set the control bus interface 528 to the active state.

The processor 510 generates an address for the image data. The processor 510 sends an address signal 740 that includes the address to the memory 512 and to the address bus interface 732. The processor 510 also sends a read signal 742 to the control bus interface 528. The control bus interface 528 inverts the read signal and sends a write signal 744 to the memory 512.

In response to receiving the address signal 740, the address bus interface 532 sends a timing signal 746 to the data bus interface 534. The timing signal 746 indicates the timing of the address signal 740. The data bus interface 534 retrieves image data 726 from the imager 508. The data bus interface 534 sends the image data 726 to the memory 512 in coordination with the timing of the address signal 740.

Figure 8:
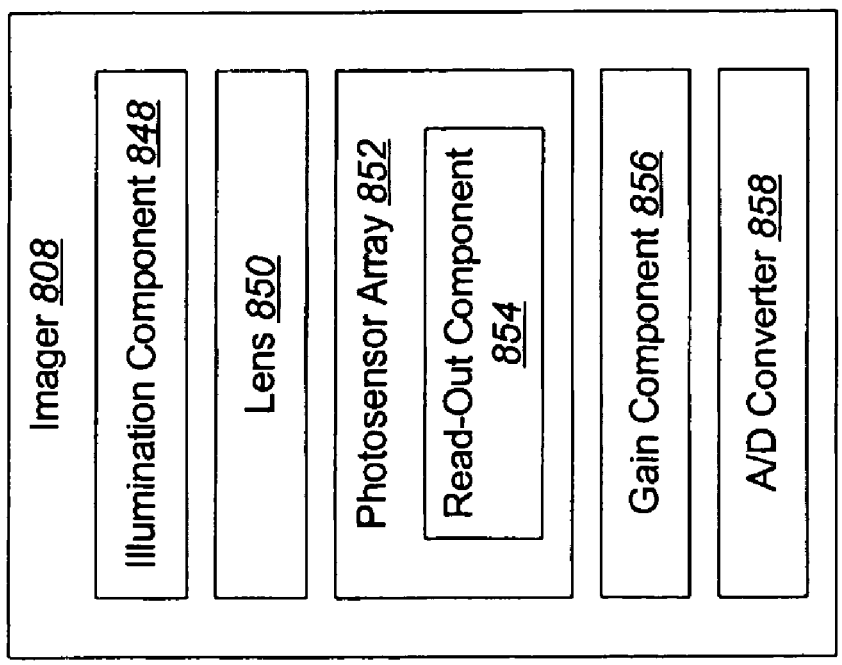
FIG. 8 is a block diagram illustrating the components in an embodiment of the imager.

FIG. 8 is a block diagram illustrating the components in an embodiment of the imager 808. The imager 808 includes an illumination component 848. The illumination component 848 typically includes a plurality of illumination elements that may be activated to illuminate the graphical code 104.

The imager 808 also includes a lens 850 and a photosensor array 852. The photosensor array 852 includes a plurality of light-sensitive elements. The lens 850 focuses a two-dimensional image of the graphical code 104 onto the photosensor array 852. Examples of photosensor arrays 852 include charge coupled devices (CCDs) and complementary metal-oxide semiconductor (CMOS) sensors. The imager 808 typically includes a housing (not shown) that shields the light-sensitive elements in the photosensor array 852 from ambient light.

In some embodiments the imager 808 may include more than one lens 850. For example, the imager 808 may include a lens piece as disclosed in co-pending U.S. application Ser. No. 10/643,004, filed on Aug. 18, 2003, entitled "Versatile Graphical Code Reader for Reading Different Types of Graphical Codes," assigned to the assignee of the present invention and hereby incorporated by reference in its entirety.

The photosensor array 852 is coupled to a read-out component 854. The read-out component 854 reads the charge that has accumulated on each light-sensitive element in the photosensor array 852 during a period of time that will be referred to as an "exposure period." The read-out component 854 also provides a plurality of electrical signals, one for each of the light-sensitive elements in the photosensor array 852. The electrical signal corresponding to a particular light-sensitive element represents the accumulated charge on that light-sensitive element.

The imager 808 also includes a gain component 856 and an analog-to-digital (A/D) converter 858. The gain component 856 adjusts the gain of the electrical signals from the read-out component 854 to utilize the dynamic range of the A/D converter 858. The A/D converter 858 digitizes the gain-adjusted electrical signals and outputs digital image data corresponding to the image of the graphical code 104.

Figure 9:
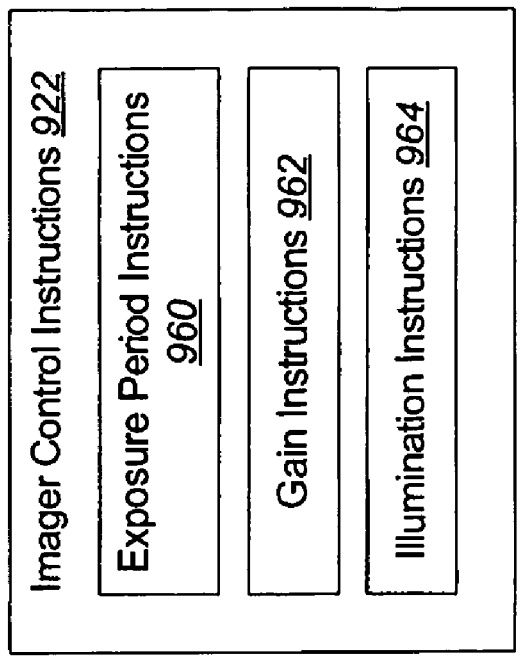
FIG. 9 is a block diagram illustrating an embodiment of the imager control instructions.

FIG. 9 is a block diagram illustrating an embodiment of the imager control instructions 922. As described previously, the imager control instructions 922 are executable by the processor 110 to control at least some aspects of the operation of the imager 108.

The imager control instructions 922 include exposure period instructions 960. As described previously, the read-out component 854 reads the charge that has accumulated on each light-sensitive element in the photosensor array 852 during an exposure period. The processor 110 executes the exposure period instructions 960 to provide control signals to the imager 108 that indicate the start and the end of the exposure period.

The imager control instructions 922 also include gain instructions 962. The processor 110 executes the gain instructions 962 to provide gain information to the gain component 856. As described previously, the gain component 856 adjusts the gain of the electrical signals from the read-out component 854 to utilize the dynamic range of the A/D converter 858. The gain information typically indicates how the gain of the electrical signals is to be adjusted.

The imager control instructions 222 also include illumination instructions 964. The processor 110 executes the illumination instructions 964 to activate and deactivate the illumination elements in the illumination component 848. Typically, the illumination elements are activated at the beginning of an exposure period and deactivated at the end of the exposure period.

Figure 10:
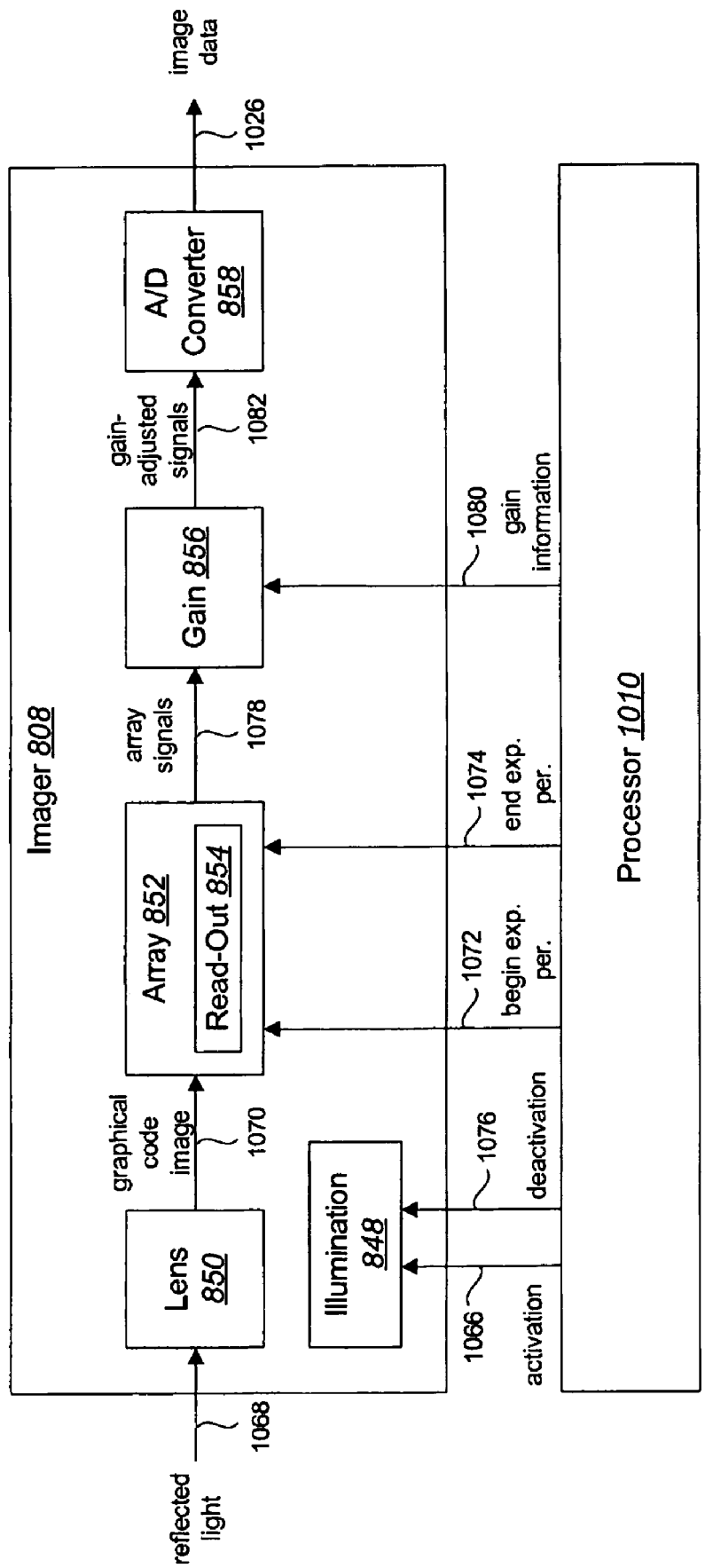
FIG. 10 is a signal flow diagram for a graphical code reader having the imager of FIG. 8 while the imager control instructions are being executed.

FIG. 10 is a signal flow diagram for a graphical code reader 102 having the imager 808 of FIG. 8 while the imager control instructions 222 are being executed. The processor 1010 sends an activation signal 1066 to the illumination component 848. In response, the illumination elements in the illumination component 848 are activated, thereby illuminating the graphical code 104. Light 1068 from the illumination elements is reflected from the graphical code 104 toward the lens 850. The lens 850 focuses a two-dimensional image 1070 of the graphical code 104 onto the photosensor array 852.

The processor 1010 sends a begin exposure period signal 1072 to the photosensor array 852 to indicate the beginning of the exposure period. This is typically done after the illumination component 848 has been activated. After the duration of the exposure period, the processor 1010 sends an end exposure period signal 1074 to the photosensor array 852 to indicate the end of the exposure period. The processor 1010 sends a deactivation signal 1076 to the illumination component 848, to deactivate the illumination elements.

After the exposure period, the read-out component 854 reads the accumulated charge on each light-sensitive element in the photosensor array 852 and provides a plurality of electrical signals 1078, one for each of the light-sensitive elements in the photosensor array 852. The electrical signal 1078 corresponding to a particular light-sensitive element represents the charge that has accumulated on that light-sensitive element during the exposure period.

The electrical signals 1078 from the read-out component 854 are provided to the gain component 856. The processor 1010 sends a gain information signal 1080 to the gain component 856. The gain component 856 uses the gain information signal 1080 to adjust the gain of the electrical signals 1078 from the read-out component 854 in order to utilize the dynamic range of the A/D converter 858. The A/D converter 858 digitizes the gain-adjusted signals 1082 and outputs digital image data 1026.

As indicated above, the imager interface may be implemented in a programmable logic device (PLD). For example, the imager interface may be implemented using a complex PLD, which requires only one-time configuration (programming). Alternatively, the imager interface may be implemented using a field programmable gate array (FPGA), which requires configuration (programming) each time the graphical code reader is powered on.

If the imager interface is implemented using an FPGA, there are several options available for configuring the FPGA. For example, the FPGA may be configured from dedicated programmable read-only memory (PROM) when the graphical code reader is powered on. If this option is utilized, the processor does not access the RAM in the graphical code reader until the FPGA is configured.

Alternatively, the FPGA may be configured from the processor when the graphical code reader is powered on. If this option is utilized, the processor uses ROM and registers but not RAM until the FPGA is configured.

Alternatively still, a dedicated memory interface may be used for image capture. This option may be utilized if the processor supports multiple memory interfaces (chip selects), which many do.

As yet another alternative, a passive bypass circuit may be provided that allows the processor to access RAM even when the FPGA is not configured. If this option is utilized, the processor may configure the FPGA at any convenient time before the first image capture.

Figure 11:
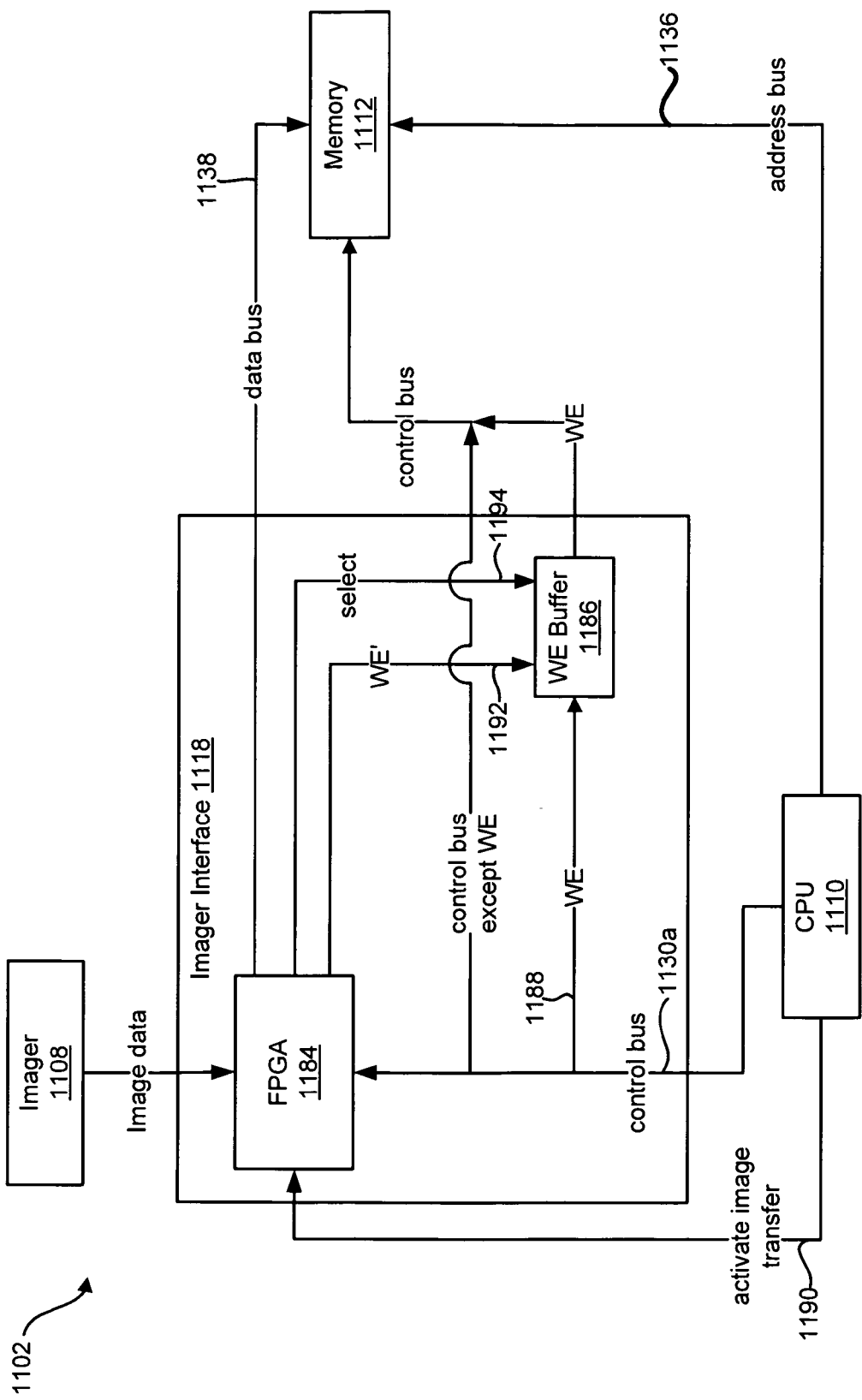
FIG. 11 illustrates an embodiment of the graphical code reader where the imager interface is implemented using a field-programmable gate array.

FIG. 11 illustrates an embodiment of the graphical code reader 1102 where the imager interface 1118 is implemented using a field-programmable gate array (FPGA) 1184. To assist with the configuration of the FPGA 1184, the imager interface 1118 also includes a passive bypass circuit. The passive bypass circuit is shown as a WE buffer 1186 in FIG. 11.

As before, the control bus includes a first portion 1130a and a second portion 1130b. The first portion 1130a of the control bus couples the CPU 1110 to the imager interface 1118. The second portion 1130b of the control bus couples the imager interface 1118 to the memory 1112.

In the illustrated embodiment, the control bus 1130 includes a write-enable line, WE 1188. During a read operation, WE 1188 is not asserted. During a write operation, WE 1188 is asserted.

The control bus 1130 is provided as an input to the FPGA 1184. The FPGA 1184 is also in communication with the CPU 1110. The CPU 1110 sets the FPGA 1184 to image capture mode by sending an activation signal 1190 to the FPGA 1184. The FPGA 1184 has two outputs, WE' 1192 and a select signal 1194.

The WE buffer 1186 accepts two inputs, WE 1188 and WE' 1192. The WE buffer 1186 selects between these two inputs via the select signal 1194. The hardware is configured such that the select signal 1194 passively selects WE 1188 and selects WE' 1192 only when the FPGA 1184 actively asserts the select signal 1194. Thus, when the FPGA 1184 is not configured (as well as when image capture is not active), WE 1188 is used. WE' 1192 is only used when the FPGA 1184 is configured and in image capture mode.

Thus, when the FPGA 1184 is configured and in image capture mode, a "read" signal from the CPU 1110 would become a "write" signal when it is delivered to the memory 1112. Image data from the imager 1108 may be provided to the memory 1112 on the data bus 1138 and an address may be provided to the memory on the address bus 1136 in coordination with the "write" signal, in the manner described above. However, when the FPGA 1184 is not configured or when the FPGA 1184 is not in image capture mode, signals pass between the first portion 1130a of the control bus and the second portion 1130b of the control bus without modification.

Figure 12:
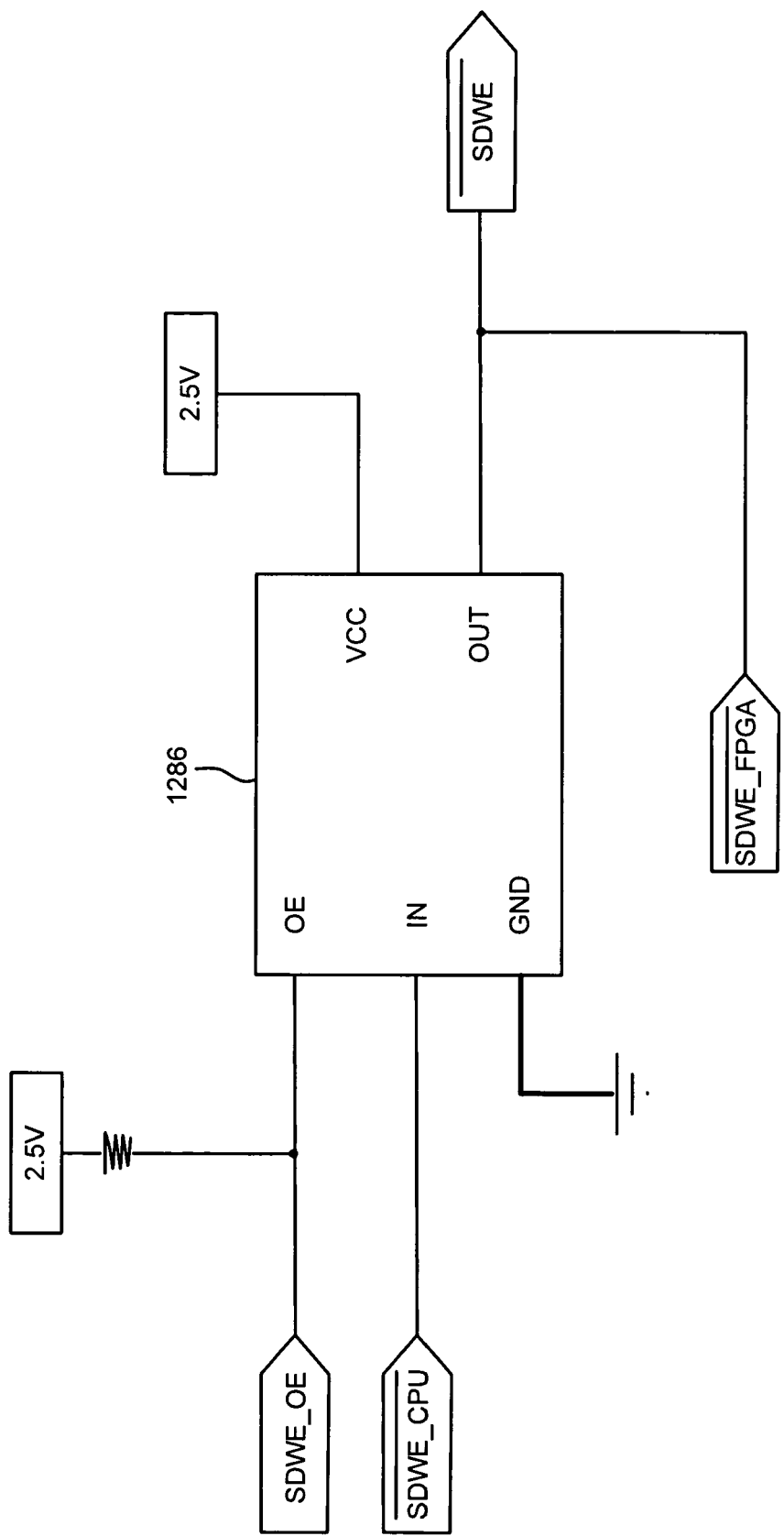
FIG. 12 is a schematic diagram showing an exemplary implementation of a write-enable buffer.

FIG. 12 is a schematic diagram showing an exemplary implementation of the WE buffer 1286. In this implementation, WE is a low-asserted signal. The WE buffer 1286 includes five pins, which are labeled OE, IN, GND, VCC, and OUT.

The signal labeled SDWE_OE is the select signal from the FPGA. This signal is provided to the OE pin on the WE buffer 1286.

The signal labeled /SDWE_CPU is the WE from the CPU. This signal is provided to the IN pin on the WE buffer 1286.

The signal labeled /SDWE_FPGA is the WE from the FPGA. The signal labeled /SDWE is the output to the RAM.

When the FPGA is not configured, its outputs are in a high-impedance state. The OE pin on the WE Buffer is passively asserted by the pull-up and thus /SDWE_CPU is output on /SDWE. Once configured, the FPGA may drive SDWE_OE low to disconnect /SDWE_CPU, and the FPGA may drive /SDWE via /SDWE_FPGA.

Figure 13:
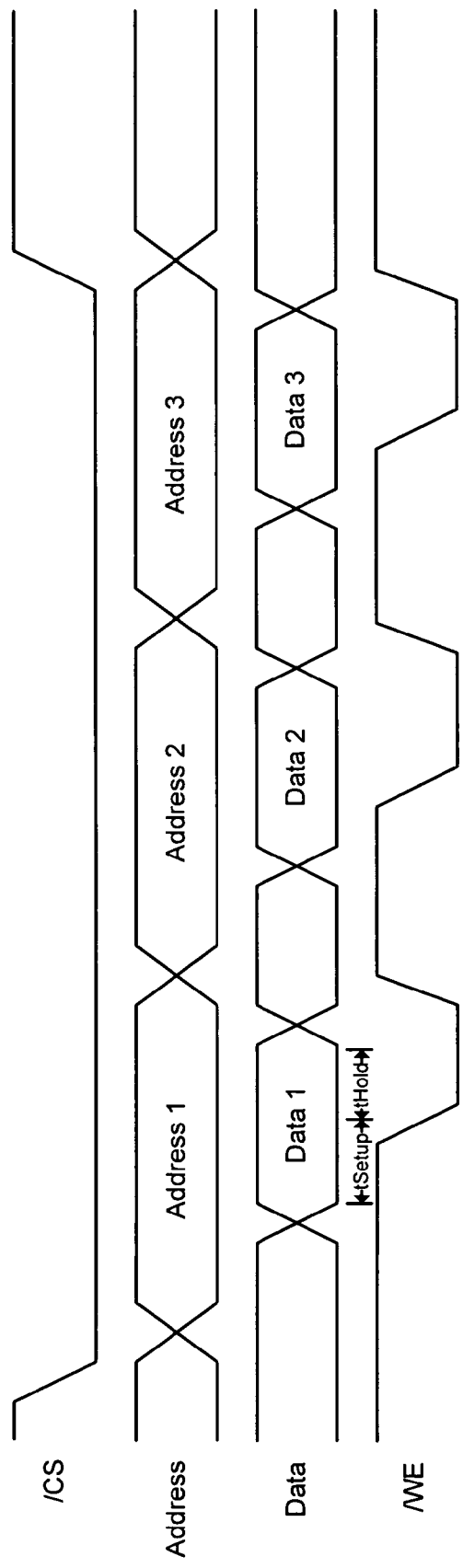
FIG. 13 is a timing diagram showing the relationship between address, data, and control signals for an exemplary memory device.

FIG. 13 is a timing diagram showing the relationship between address, data, and control signals for an exemplary memory device. The /CS signal is asserted at the beginning of a burst of several read or write cycles. The transition between cycles is detected by a change in the address signals. To perform a write operation, the data must be valid for tSetup time before the /WE signal is asserted and remain valid for at least tHold time after the leading edge of the /WE signal. The address bus interface detects a cycle start by detecting a change in the address signals. The data bus interface drives the data signals immediately upon a cycle start being detected. The control bus interface subsequently asserts the /WE signal after an additional tSetup time has elapsed. The data bus interface continues to drive the data signals until tHold time has elapsed.

Other embodiments may use other memory devices with particular control bus signals indicating the start of a memory cycle; for example, an output-enable signal may be de-asserted and re-asserted between cycles, an address strobe signal may be pulsed, or a cycle clock signal may be provided. In an embodiment using such a device, the control bus interface detects the cycle start.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A graphical code reader, comprising:
    an imager that provides image data corresponding to a two-dimensional image of a graphical code, wherein the graphical code comprises graphical code data;
    a processor;
    memory in electronic communication with the processor;
    data processing instructions in the memory;
    an imager interface that facilitates transfer of the image data from the imager to the memory;
    a control bus interface in the imager interface, wherein the control bus interface is in electronic communication with a first portion of a control bus and with a second portion of the control bus, wherein the first portion of the control bus couples the processor to the control bus interface, and wherein the second portion of the control bus couples the control bus interface to the memory;
    a data bus interface in the imager interface, wherein the data bus interface is in electronic communication with a data bus that couples the processor to the memory; and
    address generation instructions in the memory that are executable by the processor to set the imager interface to an active mode, generate an address in the memory for storing the image data, provide a read signal on the first portion of the control bus, and provide an address signal on an address bus, wherein in response to the read signal on the first portion of the control bus the control bus interface provides a write signal on the second portion of the control bus.

2. The graphical code reader of claim 1, further comprising an address bus interface in the imager interface, wherein the address bus interface is in electronic communication with the address bus, and wherein the address bus couples the processor to the memory.

3. The graphical code reader of claim 2, wherein the address bus interface detects timing of the address signal, and wherein the data bus interface provides the image data on the data bus in coordination with the timing of the address signal.

4. The graphical code reader of claim 2, wherein the write signal on the second portion of the control bus is provided in coordination with the timing of the address signal.

5. The graphical code reader of claim 2, wherein the write signal on the second portion of the control bus is provided in coordination with the timing of a signal on the first portion of the control bus.

6. The graphical code reader of claim 1, wherein the data bus interface provides the image data on the data bus in coordination with the timing of the write signal provided on the second portion of the control bus.

7. The graphical code reader of claim 1, wherein the graphical code reader is a handheld device.

8. The graphical code reader of claim 1, wherein the imager interface is implemented using a programmable logic device.

9. The graphical code reader of claim 8, wherein the programmable logic device is a field-programmable gate array.

10. The graphical code reader of claim 9, wherein the field-programmable gate array is configured from dedicated programmable read-only memory when the graphical code reader is powered on, and wherein the processor does not access random access memory until the field-programmable gate array is configured.

11. The graphical code reader of claim 9, wherein the field-programmable gate array is configured from the processor when the graphical code reader is powered on, wherein the processor uses read-only memory and registers to configure the field-programmable gate array, and wherein the processor does not access random access memory until the field-programmable gate array is configured.

12. The graphical code reader of claim 9, further comprising a passive bypass circuit that allows the processor to access random access memory even when the field-programmable gate array has not been configured.

13. The graphical code reader of claim 9, wherein a dedicated memory interface is used for image capture.

* * * * *